United States Patent [19]
Neidhardt

[11] Patent Number: 5,943,480
[45] Date of Patent: Aug. 24, 1999

[54] METHOD AND SYSTEM FOR DETECTING CAMOUFLAGED CONGESTION ON A NETWORK RESOURCE

[75] Inventor: Arnold L. Neidhardt, Middletown, N.J.

[73] Assignee: Telcordia Technologies, Inc., Morristown, N.J.

[21] Appl. No.: 08/752,081

[22] Filed: Nov. 19, 1996

[51] Int. Cl.$^6$ .................................................. G06F 12/00
[52] U.S. Cl. ...................................................... 395/200.56
[58] Field of Search ............................. 395/200.36, 675, 395/674, 200.56, 200.53, 200.31

[56] References Cited

U.S. PATENT DOCUMENTS

| | | | |
|---|---|---|---|
| 5,031,089 | 7/1991 | Lui et al. ........................... | 395/200.56 |
| 5,572,672 | 11/1996 | Dewitt et al. ....................... | 395/184.01 |
| 5,732,240 | 3/1998 | Caccavale ............................ | 395/879 |
| 5,742,819 | 4/1998 | Caccavale ............................ | 707/200 |

*Primary Examiner*—Ellis B. Ramirez
*Assistant Examiner*—William Titcomb
*Attorney, Agent, or Firm*—Joseph Giordano; David A. Hey

[57] ABSTRACT

A method and system for estimating the actual demand on a resource in a computer or communication network is taught using patterns of the traffic volume carried by the resource. Monitors on network resources periodically measure queue size and average transmission occupancy over the period. The monitors also mark times of queue overflow. Data transmission populations within the system are estimated between queue overflows and the resulting pattern is used to distinguish actual user demand that may be camouflaged by a reduction in traffic caused by the transport protocol response to lost or corrupted data transmissions.

12 Claims, 2 Drawing Sheets

5,943,480

METHOD AND SYSTEM FOR DETECTING CAMOUFLAGED CONGESTION ON A NETWORK RESOURCE

FIELD OF THE INVENTION

The present invention relates to the field of computer or communication network management and provides network administrators with a method for obtaining more accurate information about the demands on network resources than previous methods. This more accurate information enables administrators to better understand ongoing demand for network resources and thus to better project future demand so that more efficient routing and expansion decisions for the network can be made than are presently possible.

BACKGROUND OF THE INVENTION

A computer or communication network administrator is a person who manages a computer or communication network through which information flows. Companies typically hire network administrators to oversee the operations of the networks or parts of networks that the companies own. Key functions performed by these network administrators include: 1) routing the flow of electronic information (which may be referred to as "traffic") between two points; 2) determining when more network links (electronic connections) are needed between two points; 3) determining when a higher capacity processor is needed at a particular location in the system; and 4) determining that there is more equipment serving the network than is required.

In performing these functions, a network administrator continually tries to measure the demand that users of the network place on network resources. For example, the network administrator may attempt to identify those parts of the network that are experiencing more demand than can be efficiently supported. Traditionally, a network administrator estimates the demand for the resources of the network simply by correlating demand to the traffic observed at those resources. This approach, however, can provide a highly inaccurate picture of the actual demand, as discussed more fully below.

The problem recognized by the present invention is that present measures of actual traffic carried by a network resource may not truly indicate how large of a demand is placed on that resource. This may result, in part, from the functioning of the "transport protocol" typically used by a network to manage electronic traffic. An example of a transport protocol is Transmission Control Protocol (TCP) (developed around 1980), which is used to manage much of the traffic on the Internet.

Traffic

A primary example of traffic within a network is the transfer of files among users. During a file transfer, the users want a reliable stream delivery service. A reliable stream delivery service sends a single and complete copy of the file in the proper order to the transfer destination. Transport protocols govern how users send files across a single network or across many connected networks.

To accomplish reliable service, a transmitter following the protocol breaks the file into smaller packets of information. This transmitter arranges these packets in the proper order and begins sending them to their electronic destination in a "stream." Each information packet includes some overhead; part of this overhead provides routing information, sequencing information, and a cyclic redundancy check to recognize corrupted packets. The receiver reassembles the packets to form a complete copy of the file being transferred. To serve their purpose, the packets are small enough to make it unlikely they will be corrupted during transmission. If the packets do become corrupted, their small size also makes it convenient to re-transmit the missing information without the need for re-transmitting the entire file.

As the packets are received, the receiver checks on their accuracy with the help of the cyclic redundancy check. If an arriving packet is accurate, its information is used, and if the packet contains data, the receiver eventually returns an acknowledgment to the transmitter. By monitoring acknowledgments from the receiver, the transmitter can infer whether the data packets being sent are arriving completely and accurately, so that the transmitter can decide whether to continue sending new data packets or to retransmit old ones.

Congestion

Congestion of a network resource occurs when many users simultaneously try to send files across the network. Typically a network installs enough equipment to carry the traffic it expects to receive, but expectations are not 100% accurate. Thus, there are certain times when a network is under-utilized and not carrying much traffic and there are other times when there is more demand for the network resources than it is designed to carry.

In the case of a network with insufficient capacity to serve its customers well (i.e., more demand than the network is designed to carry), the network administration should respond by increasing the capacity of the network. For example, he or she may purchase more or better equipment. However, because of cost, a network administrator is unlikely to invest the funds necessary to upgrade a network unless the administrator is relatively certain of the need for doing so.

As mentioned, the traditional method for determining the demand on a network, upon which an administrator may rely in making an upgrade decision, is simply the amount of traffic arriving at the network resources. If the amount of traffic in the oversubscribed network is not exceeding expectations, then an administrator following the traditional method would have no reason to invest in a network with greater capacity. However, a problem with simply using the volume of arriving traffic as the estimate of demand on a network resource is that such a method may not accurately measure demand because some transport protocols are configured to sharply limit the number of packets being sent and received whenever there is the slightest hint of a problem: When any disruption of the traffic occurs (i.e., an information packet is lost or inaccurately transmitted) transport protocols respond by drastically reducing the volume of the traffic being sent. Thus, when a measure is taken of how much traffic is being carried by the resource at such a time, the network administrator will see reduced traffic even though many users may be trying to use the resource (i.e., even though demand is high). Thus, a simple measure of traffic at these times does not reflect actual demand.

The present invention addresses this problem, which has gone unrecognized because of its nature. The name given the problem by the inventor is "camouflaged congestion." Because, as noted above, transport protocols, especially TCP, respond to any problems they encounter in transmitting information by reducing the number of packets being sent (i.e., by reducing the traffic), a resource may experience both excessive demand and a deceptively low traffic flow, and this congestion is "camouflaged"; the network administrator, who is looking only at the volume of arriving traffic, will be mistakenly unaware of the need to increase the capacity of the network.

As noted, a situation during which traffic disruption may occur is when a large number of users are trying to send data over a single link between different parts of a network. The many information packets that are generated for each of the files being transferred can't all be sent simultaneously. As a result, the packets are lined up in a queue to be sent as soon as the resource can accommodate them. If too many packets are waiting to be sent at the same time, the memory buffer of the network resource cannot contain them and the queue overflows. Packets being lined up when the queue overflows may be lost completely.

In a network that handles internally only smaller packets, which are called cells, while segmenting and reassembling users' large packets as they enter and leave the network, the problem may be made worse. Specifically, if a queue for an internal resource overflows in such a network, it is natural to drop arriving traffic on a cell-by-cell basis. In such a case, the resource will often be serving cells that can no longer be reassembled into whole packets. Even more serious than the obvious waste of the congested resource's time on useless cells are the traffic-reducing reactions of the users' protocols to damaged packets. Individually, the reaction to a damaged packet is the same as to a lost packet, but because cell-by-cell dropping damages more packets (since the cells may be dispersed among packets), these damages, together with the cumulative reactions of users' protocols to cell damage are more severe.

Overflows

To help avoid continuing overflows, TCP and similar transport protocols were designed to detect network congestion when packets are lost or corrupted during transmission. As noted above, in responding to the congestion, the transport protocols reduce the traffic being sent: TCP maintains a window which limits the number of information packets the TCP source allows itself to have outstanding.

For example, suppose the user of a TCP connection wants to transfer a large file of a thousand packets. At this point in the connection, when the file transfer begins, the TCP source may have a window size of ten packets. This means TCP will send packets 1, 2, 3, 4, 5, 6, 7, 8, 9, and 10. TCP will then wait for an acknowledgment from the receiver that at least packet 1 had arrived intact before sending packet 11. If the receiver acknowledges having received packets 1 and 2, TCP will send packets 11 and 12. In this way, TCP always has no more than 10 packets in transmission simultaneously.

Now suppose the packets encounter congestion during transmission and become lost or corrupted. Perhaps after TCP sends packets 11 and 12, an unusually long time passes and no acknowledgment of packet 3 is received. TCP will eventually assume that packet 3 was lost in transmission. TCP will then retransmit packet 3, but it will also reduce the size of its window; that is TCP will reduce the number of packets that can be in transmission at any one time. TCP is typically configured to cut its window size in half when adjusting for congestion. Thus, whereas before it allowed 10 packets to be in transmission simultaneously, TCP will now only allow 5 packets to be in transmission at any one time. This obviously reduces the amount of traffic the network is being asked to carry.

Conversely, to compensate for such window reductions, TCP is also configured to increase the size of the window if no congestion is being encountered. However, when the window size is increased, it is not doubled, but merely incrementally increased by one. For example, if congestion had caused TCP to decrease the window size to five packets in transmission, then, after receiving the acknowledgments of a window's worth (5) of packets delivered successfully in a row, TCP will increase the size of the packet transmission window to six. This procedure repeats allowing the window size to continue to grow over time as long as no problems are encountered transmitting information packets.

In such a case, the traffic pattern may begin to "cycle." As packet windows increase, the amount of traffic will slowly increase until the resource reaches capacity. For a brief period thereafter, the resource will operate at its capacity, but not for long, because as packet windows continue to increase, the extra packets outstanding have the effect merely of filling the queue. At that point, the queue overflows, packets are lost or corrupted, and the transport protocol reduces the window size and, consequently, the traffic volume. With the traffic reduced, the windows will begin increasing again until the network resource queue overflows and the transport protocol reduces window size again. Thus, a cycle is exhibited.

Because transport protocols drastically reduce their window size in response to the slightest indication of congestion, and only increase the diminished window size through small, periodic increments, there may be many file transfers that users are attempting to make (i.e., a heavy demand for the network), but the network may appear uncongested because the transport protocols have reduced the traffic allowed. The network resource thus operates below capacity a majority of the time while the window sizes are growing, since a resource will be carrying traffic at its capacity for only a short time before congestion is indicated to the transport protocol and the window size is reduced. If the administrator monitors only the volume of traffic through the resource, it will appear that the resources are operating below capacity a majority of the time. This will almost certainly be misinterpreted by the network administrator to mean that the network is adequately meeting the demands placed on it.

Other Consequences of Camouflaged Congestion

Another aspect of camouflaged congestion is user frustration. When the network becomes congested and the transport protocol starts cutting information packet window size, a network user may wait an unreasonable amount of time to complete a file transfer. This typically leads to the user becoming frustrated and abandoning his attempts to use the network. Frustrated users represent demand for the network that cannot be measured by looking at the amount of traffic the network is carrying. Again, by simply measuring the past traffic volume through a network resource, a system administrator does not get an accurate picture of how much traffic there might have been if the network owner had actually supplied resources with greater capacity.

For example, a user may be browsing the World Wide Web. A Web user typically clicks on a button to request a home page, which is basically a rather large file, from another location. The requested page gets transferred from where the page resides to the screen of the user. The information flow required to transmit the page is governed by TCP.

If the Web user were located in Philadelphia and requested the home page of the White House located in Washington, the White House home page will be transferred across the network to the requesting user. If that transfer were to encounter congestion, the transport protocol could reduce the speed of the transfer. If this were to occur, the user could wait several minutes instead of seconds to find out what the White House home page was saying that day.

Experiencing such a delay in response to each request, a user may get frustrated and stop using the network. This is thus an effect of camouflaged congestion. The network administrator looking at the network traffic report would see one screen transferred from the White House to the user and may conclude that there was no other user demand. In reality, if the response time had been shorter, allowing the user to continue without undue delays, he or she would likely have continued to use the network for an indefinite period by accessing additional screens and information. Therefore, if the network administrator equates traffic volume with demand, he or she will be seriously misled.

Accordingly, the present invention is intended to address these problems and provide the network administrator with the best possible information about the actual demand for the network.

SUMMARY OF THE INVENTION

An object of the present invention is to enable the system administrator of a computer or communication network to accurately measure the actual demand for the network by monitoring the patterns of network traffic in conjunction with queue behavior in some detail, rather than monitoring just sheer traffic volume, even augmented by average queue sizes and overflow totals.

Additional objects, advantages and novel features of the invention will be set forth in part in the description which follows. Such objects, advantages and novel features will also become more apparent to those skilled in the art upon examination of the following or may be learned by practice of the invention. The objects and advantages of the invention may be realized and attained by means of the instrumentalities and combinations particularly pointed out in the appended claims.

To achieve the stated and other objects of the present invention, as embodied and described below, the invention may comprise the steps of:

monitoring traffic through a resource;

marking times at which a queue for the resource overflows;

marking the first instant after a first queue overflow at which the network resource is idle;

calculating an estimated data population for the resource at a plurality of times between the first idle instant and a second queue overflow; and indicating excessive demand for the resource if the calculated data populations show an increase over time.

BRIEF DESCRIPTION OF THE DRAWINGS

The accompanying drawings, which are incorporated in and form a part of the specification, illustrate the present invention and, together with the description, serve to explain the principles of the invention. In the drawings.

DETAILED DESCRIPTION OF THE PREFERRED EMBODIMENT

Using the drawings, the preferred embodiment of the present invention will now be explained.

Camouflaged congestion can be a problem within an isolated network, or it may be a problem in a network that is connected to thousands of other networks. Additionally, each network may be confined within a single building or may stretch across the country.

Figure 1:
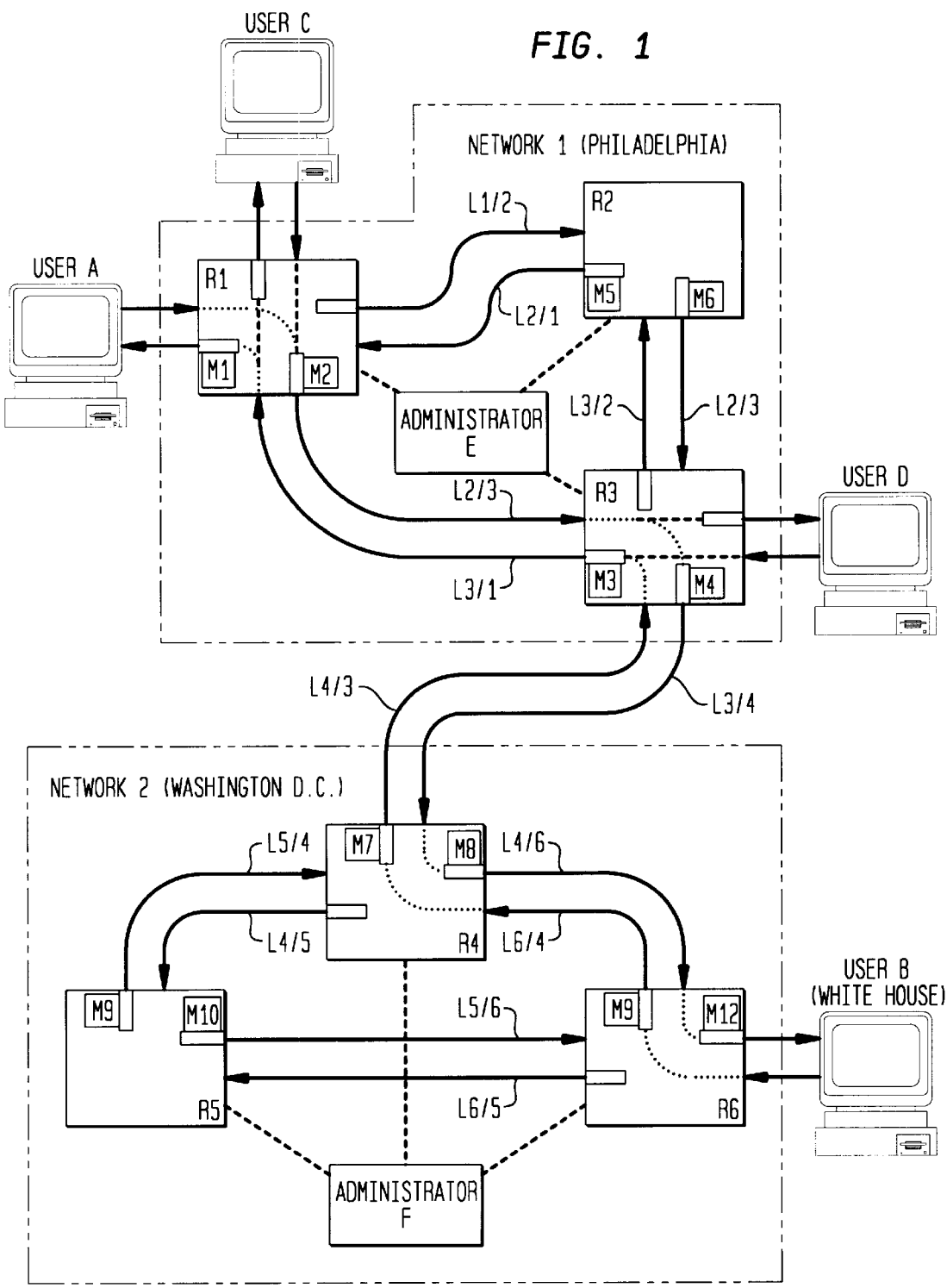
FIG. 1 is a block diagram showing two networks monitored by the method of the present invention.

FIG. 1 shows a block diagram of two networks, a first network (Network 1) serving an area around Philadelphia and a second network (Network 2) for Washington, D.C. Each network includes a number of switching nodes (marked on the diagram as R1–R6), internodal links, and access ports to which users can establish links. In the consideration of congestion on links, it is important to distinguish the directions of transmission, because each direction can become congested almost independently. Accordingly, for this discussion, links should be understood as unidirectional. FIG. 1 emphasizes this distinction by drawing two unidirectional links (e.g., L3/1 and L2/3) whenever a pair of nodes is joined at all. In the figure, most of the internodal links are between nodes of the same network, though one pair is shown between the two networks (L4/3 and L3/4). When more traffic arrives simultaneously than a link can forward immediately, the excess waits in a queue. In FIG. 1, these queues are drawn as tiny rectangles within the nodes at the transmitting ends of the links. With the possibility of congestion at any link, it is natural to monitor all the links and their queues, and this monitoring function is indicated in the figure with the monitors M1–M18 placed near the corresponding queues where the congestion could be recognized. The monitors are to help the network administrators E and F, both to determine how well the current users are being served and to project future demand.

In general, there could be other potential bottlenecks, such as the processors inside the network nodes, and all such potential bottlenecks should be monitored. The discussion of this example, however, will be couched mostly as if only the lines can be congested, which agrees with what is shown in FIG. 1.

FIG. 1 also contains some of the users that place traffic on the networks (Users A through D). In this example, User A is a World Wide Web browser, located in Philadelphia, accessing the White House home page in Washington, D.C. User B is the White House file server where the White House home page resides. User A sends a request for the home page to User B, and User B responds by returning the page, where the packets composing the interaction are routed appropriately by the networks, as is known in the art, through the links and nodes on paths between the users. The home page is a large file, so its transfer from User B to User A requires many packets, and these packets are transmitted in accordance with the TCP protocol. In particular, in addition to assuring complete delivery of the home page through appropriate retransmissions, the protocol also tends to restrict the rate of transmission if any congestion ever develops, as has been described earlier.

The figure also shows Users C and D engaged in their own interaction while the transfer of the home page is going on from User B to User A. In particular, the link L3/1 is on the paths from User D to User C. If a file transfer from User D to User C occurs while the transfer of the home page is being made from User B to User A, link L3/1 could become congested for this period. In reaction, the protocols employed by Users B and D would tend to restrict their transmission rates.

The issue is whether network administrator E will be made aware of this congestion on link L3/1 through the monitors, particularly the monitor M3 of link L3/1. Traditionally, the demand for a resource such as link L3/1 has been estimated simply as the volume of arriving traffic. Yet with the users' protocols restricting their traffic during any episode of congestion, all that a traffic-volume measurement will indicate is that the arriving traffic is well below the link's capacity. Even if overflow totals are noted, all they can tell the administrator is that one or more incidents of overflow occurred in which losses were very tiny (tiny because the Users' protocols restrict traffic rates well enough to ensure that losses are never large). Whether users have significant excess demand creating long periods of congestion in which traffic is restricted by the users' protocols, or whether the demand is mostly within network capacity with a few isolated incidents of overflow in which very few packets are lost, the monitors can report the same totals for traffic volume and overflows. The task is to distinguish these situations. By using the method and system of the present invention and examining the patterns over time of the basic measurements of carried traffic, queue sizes, and overflows, it is possible to obtain a much more accurate picture of the actual demand.

The present invention is a method and system for analyzing network resource traffic patterns to look for the signature of camouflaged congestion. In the preferred embodiment, the pattern-analysis functions would be performed by the individual monitors M1–M18 before reporting to the network administrators E and F, respectively. Alternatively, the pattern analysis could be performed by a more central administrative processor.

The basic measurements that monitors make can be at very fine time scales, such as, for example, every 20 milliseconds. In the preferred embodiment of the invention, the monitors accumulate and store in memory the basic measurements of traffic volume, queue sizes, and overflows. The stored data is then analyzed for patterns signifying camouflaged congestion. The monitor reports to the network administrator E or F regularly. A standard reporting interval may be approximately 15 minutes.

Figure 2:
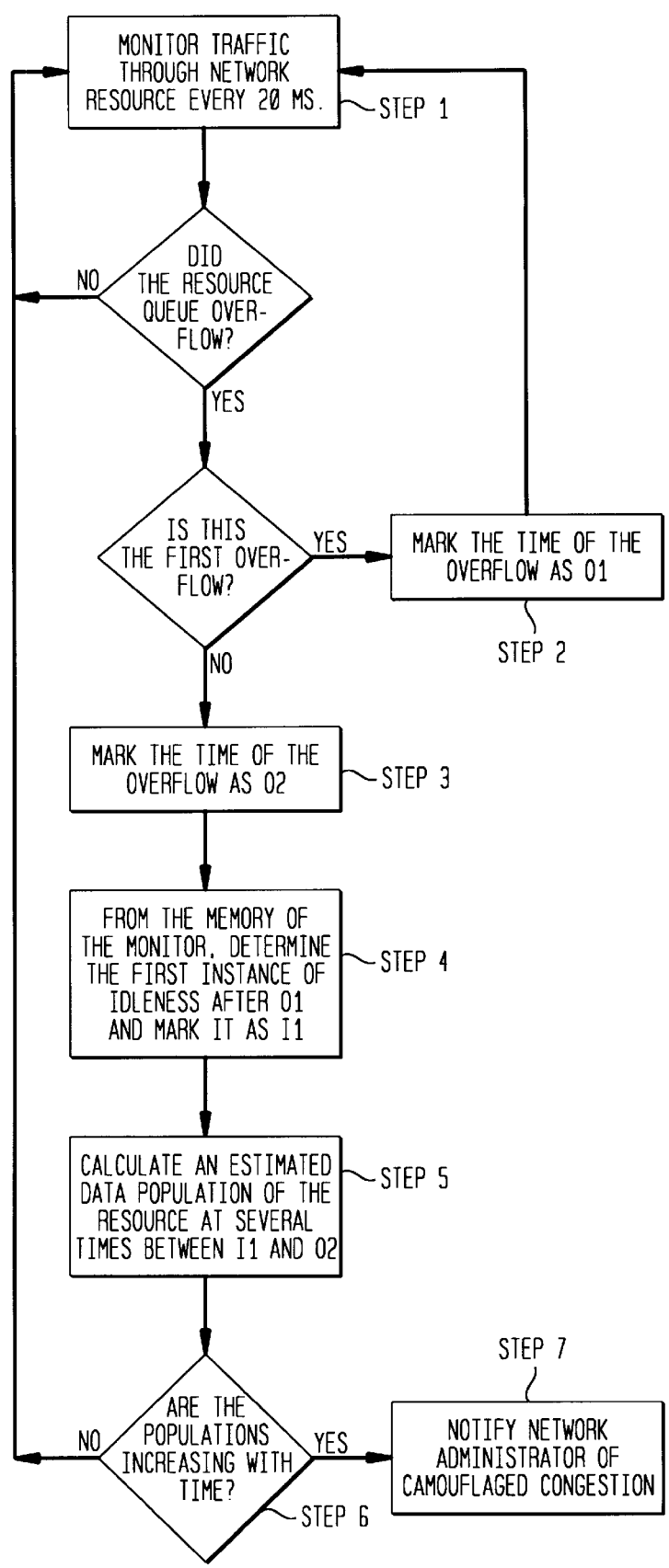
FIG. 2 is a flow-chart showing the steps of the method of the present invention.

To determine whether low traffic volume is, in fact, lack of demand, the monitors of the present invention perform a seven-step procedure, as illustrated in FIG. 2. This procedure generally measures whether an increase in traffic is occurring between queue overflows, indicating a cyclic effect:

Step 1: Every 20 milliseconds or so, the monitor measures the volume of the traffic through the associated network resource and stores the measurements in memory. Specifically, the monitor determines the size of the queue at the end of the interval and the average occupancy over the interval. The average occupancy of the resource is defined by what fraction of the 20 milliseconds preceding the measurement the resource spent actually doing work and what fraction was spent waiting for work to appear. The monitors of resource occupancy may function, in part, by maintaining vacancy counters. For every instant when the associated resource is idle, a vacancy counter is incremented in the resource monitor. For example, assume the monitors are recording measurements every 20 milliseconds as in the examples above. Every 20 milliseconds, each monitor reads the vacancy counter for the number of instances within that 20 millisecond period that the associated resource sat idle. The vacancy counter is then reset to zero to begin counting for the next 20 millisecond interval.

The monitor for a given resource may be disposed on a separate monitor chip that reads and resets a vacancy counter. Alternatively, it might be part of an operating system that interrupts itself every 20 milliseconds to perform monitoring functions, such as reading and resetting vacancy counters.

Step 2: The monitor marks the time at which a measurement is taken if an overflow of the queue occurred in the 20 milliseconds preceding the measurement. This time is labeled O1. In the next measurement, 20 milliseconds later, the monitor will determine if the overflow is still occurring.

Step 3: The monitor continues taking and storing measurements every 20 milliseconds until the next queue overflow occurs. The time of the second queue overflow is labeled O2.

Step 4: Once the monitor detects a second queue overflow, it examines all the measurement data taken between O1 and O2 for a pattern that indicates camouflaged congestion. At this point, the monitor begins looking for the first time after O1 but before O2 when the resource experienced any idleness.

Identifying the points in time at which an overflow and idleness occur is important for identifying a cyclic effect of congestion. Once an overflow occurs, the resource will be very busy. As a result, immediately after the overflow, the resource will likely be working all 20 milliseconds of each measurement interval. Eventually, the monitor will see an interval in which the resource is not fully occupied. This first instance of idleness is a point in time labeled I1.

Step 5: The monitor then computes an estimated population, P(I), of the data controlled by the transport protocol for a number of the intervals (I) observed between I1 and O2. This computed value P(I) is meant to estimate all the outstanding unacknowledged packets in transit on connections using the resource, whether the packets are currently waiting in the resource's queue or are elsewhere on their routes. Correspondingly, the value P(I) is computed by summing the queue size at the end of interval I and a multiple of the average occupancy of the resource. The average occupancy will be a fraction between 0 and 1 indicating the percentage occupancy averaged over the measurement interval. The queue size will be measured in bytes or packets of data. In order to relate the two quantities so that they can be meaningfully added, the monitor must have an estimate of a typical empty-system round-trip time (R) for a typical connection hypothetically to send data on its route through the resource and receive an acknowledgment without competing with other traffic. This time R need not be highly accurate. With its help, the population estimate can be calculated as follows:

$$P(I) = Q(I) + rho1(I) * R/tau$$

Where:

P(I) is the estimated population of data maintained in circulation by all the connections;

Q(I) is the size of the queue at the end of the measurement interval (I);

rho1(I) is a perhaps smoothed version of the resource occupancy measured for interval (I) as measured by the monitor. Ideally, the occupancy would be measured over an interval whose duration is R, but nearly the same effect is achieved by employing a smoothed version rho_s of the raw measurements rho_r over the recent intervals, whether by setting rho_s to the average of the last (R/20 ms) raw measurements rho_r, or merely by updating rho_s at each interval by giving the new raw measurement rho_r a weight (20 ms/R) and the old smoothed value a weight ((R-20 ms)/R);

R is the data round-trip transmission time, the time required to send an information packet and receive an acknowledgment, if there is no other traffic over the resource; and tau is the work time of the resource. For example, if the resource is a data transmission line, if the queue size Q(I) is measured in bits, and if the round-trip time R is measured in seconds, then tau is the inverse of the line speed in bits per second (bps).

Step 6: Finally, after calculating the estimated populations P(I) for a number of points in time between I1 and O2, the monitor checks to see if the calculated populations are increasing. If the population estimates are uniformly increasing, that indicates that following the queue overflow, the transport protocol, for example TCP, reduced window sizes and the window sizes were then slowly increased. Therefore, even though the traffic volume appears below capacity, camouflaged congestion is detected.

Step 7: If camouflaged congestion is detected, the system administrator is notified.

Interpreting the Data

With all the random fluctuations in estimated population, even a steadily increasing population function between I1 and O2 may appear a little ragged or be difficult to detect. However, detecting camouflaged congestion is important enough that it should be attempted despite the inherent noise problems.

A sufficient number of estimated populations must be considered to get an accurate picture of the actual aggregate movement of the population size underneath the noise. Six intermediate measurements between I1 and O2 will provide enough constraints to eliminate many false indicators of camouflaged congestion, while not creating so many barriers that true camouflaged congestion would never be detected.

Specifically, assuming that R, the no-traffic round-trip time is 70 milliseconds, the monitor should calculate the first population estimate one round-trip interval, 70 milliseconds, after I1. At (I1+R), which will be labeled S1, the calculated population should be zero, or as close to zero as will ever occur. In the preferred embodiment, the estimated population would then also be calculated at O2, which will be labeled S6, and at four evenly spaced intermediate points in time between S1 and S6 (S2, S3, S4, and S5). This gives the monitor six population estimates to analyze for a pattern of steady increase.

Thus, given a calculated population estimate at six points in time (S1, S2, S3, S4, S5 and S6), if the population for S2 is larger than that for S1, and that for S3 is larger than for S2, etc., the whole interval from O1 to O2 is declared a period of camouflaged congestion. The monitor then so reports to the network administrator.

As noted above, in the preferred embodiment, this report to the network administrator is compiled and sent approximately every 15 minutes. The report may include varying amounts of detail depending on the needs of the administrator. For example, the monitor could report on each "O1 to O2" interval within the 15 minute period for which camouflaged congestion was declared. A less complex report could indicate only that camouflaged congestion was detected at some point within the 15 minute reporting period.

Between these extremes, the monitor may report 2 numbers for each 15-minute period: 1) the sum of the lengths of O1-to-O2 intervals of camouflaged congestion during this period; and 2) the average resource occupancy over these intervals. (Since this occupancy represents the carried load during the camouflaged part of the period, the difference between 100% and this occupancy, times the total length of camouflage, is a first approximation to the demand missed by the usual reports of carried load.)

Summation

Without the detection of camouflaged congestion, the administrator could simply look at the traffic volume reported for each 15 minute interval as described above, and not realize that user demands are failing to be met. Because too many users are trying to use the resource and the transport protocols are automatically restricting traffic, the administrator may find that over the 15 minute reporting period, the resource carried traffic at only 30% of capacity. The administrator may then assume that the network will meet the demand of its users for at least the projected future. For example, the administrator could estimate that if the traffic volume is growing at 50% every six months, given 30% occupancy now, the resource will be carrying 45% of capacity in six months. The administrator will accordingly take no steps to upgrade the resource.

However, the reality may be that the resource is not meeting even the present demand and upgrades should be undertaken immediately. If the present invention is used to detect camouflaged congestion, the network can be much more timely and efficiently upgraded to meet the needs of its users and to avoid hampering productivity.

The above description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application to enable others skilled in the art to best utilize the invention in various embodiments and with various modifications as are suited to the particular use contemplated. It is intended that the scope of the invention be defined by the following claims.

What is claimed is:

1. A method for determining the demand for a resource in a computer or communication network comprising:

monitoring traffic through a resource;

marking times at which a queue for the resource overflows;

marking the first instant after a first queue overflow at which said resource is idle;

calculating an estimated data population for said resource at a plurality of times between said first idle instant and a second queue overflow; and indicating excessive demand for the resource if the calculated data populations show an increase over time.

2. The method as claimed in claim 1, wherein the step of monitoring the traffic through the resource further comprises:

periodically measuring a size of said resource queue; and periodically measuring an average occupancy of the resource over a time period.

3. The method as claimed in claim 1, wherein said plurality of times is six evenly spaced times.

4. The method as claimed in claim 1, wherein said estimated data population is calculated by:

$$P(I)=Q(I)+rho1(I)*R/tau$$

wherein:

P(I) is said estimated data population;

Q(I) is a size of said queue;

rho1(I) is an average resource occupancy;

R is a data round-trip transmission time through said resource in the absence of other transmissions; and tau is the work time of said resource.

5. The method as claimed in claim 1, wherein said step of indicating excessive demand for the resource further comprises indicating an excessive demand for said resource if the population estimate increased in detail between said first idle instant and said second queue overflow.

6. The method as claimed in claim 1, further comprising the steps of:
   comparing times of drops in traffic volume and times of queue overflows; and
   indicating the resource monitored is inadequate to meet demand if the times of drops in traffic volume substantially correspond to the times of queue overflows.

7. A system for determining the demand for a resource in a computer or communications network comprising:
   a monitor for monitoring traffic through a resource;
   memory means for marking times at which a queue for the resource overflows;
   memory means for marking the first instant after a first queue overflow at which said resource is idle;
   means for calculating an estimated data population for said resource a plurality of times between said first idle instant and a second queue overflow; and
   an indicator for indicating excessive demand for the resource if the calculated data populations show an increase over time.

8. The system as claimed in claim 7, wherein the monitor for monitoring traffic through a resource further comprises:
   means for periodically measuring a size of said resource queue; and
   means for periodically measuring an average occupancy of the resource over a time period.

9. The system as claimed in claim 7, wherein said plurality of times is six evenly spaced times.

10. The system as claimed in claim 7, wherein said estimated data population is calculated by:

$$P(I) = Q(I) + rho1(I) * R/tau$$

wherein:
   P(I) is said estimated data population;
   O(I) is a size of said queue;
   rho1(I) is an average resource occupancy;
   R is a data round-trip transmission time through said resource in the absence of other transmissions; and
   tau is the work time of said resource.

11. The system as claimed in claim 7, wherein said indicator further comprises means for indicating an excessive demand for said resource if the population estimate increased in detail between said first idle instant and said second queue overflow.

12. The system as claimed in claim 7, further comprising:
   a comparator for comparing times of drops in traffic volume and times of queue overflows; and
   an indicator for indicating the resource monitored is inadequate to meet demand if the times of drops in traffic volume substantially correspond to the times of queue overflows.

* * * * *